US010402795B2

(12) United States Patent
Nardone et al.

(10) Patent No.: US 10,402,795 B2
(45) Date of Patent: Sep. 3, 2019

(54) PREFUNDING FOR MONEY TRANSFER SEND TRANSACTIONS

(75) Inventors: Lorenzo Nardone, Rome (IT); Shaun Buswell, London (GB)

(73) Assignee: MoneyGram International, Inc., Dallas, TX (US)

( * ) Notice: Subject to any disclaimer, the term of this patent is extended or adjusted under 35 U.S.C. 154(b) by 0 days.

(21) Appl. No.: 13/344,175

(22) Filed: Jan. 5, 2012

(65) Prior Publication Data

US 2013/0179334 A1 Jul. 11, 2013

(51) Int. Cl.
*G06Q 40/00* (2012.01)
*G06Q 20/10* (2012.01)

(52) U.S. Cl.
CPC ............ *G06Q 20/10* (2013.01); *G06Q 40/00* (2013.01)

(58) Field of Classification Search
CPC ........ G06Q 40/00; G06Q 20/29; G06Q 20/00; G06Q 20/10
See application file for complete search history.

(56) References Cited

U.S. PATENT DOCUMENTS

| | | |
|---|---|---|
| 5,326,960 A | 7/1994 | Tannenbaum |
| 5,432,326 A | 6/1995 | Noblett, Jr. et al. |
| 5,434,929 A | 7/1995 | Beernink et al. |
| 5,604,802 A | 2/1997 | Holloway |
| 5,864,483 A | 1/1999 | Brichta |
| 5,920,848 A | 7/1999 | Schutzer et al. |
| 5,949,044 A | 9/1999 | Walker et al. |
| 5,974,146 A | 10/1999 | Randle et al. |
| 6,010,067 A | 1/2000 | Elbaum |
| 6,018,718 A | 1/2000 | Walker et al. |
| 6,039,250 A | 3/2000 | Ito et al. |
| 6,073,090 A | 6/2000 | Fortune et al. |
| 6,139,177 A | 10/2000 | Venkatraman et al. |
| 6,205,433 B1 | 3/2001 | Boesch et al. |
| 6,292,786 B1 | 9/2001 | Deaton et al. |
| 6,370,514 B1 | 4/2002 | Messner |
| 6,554,184 B1 | 4/2003 | Amos |
| 6,661,466 B1 | 12/2003 | Kou |
| 6,687,679 B1 | 2/2004 | Van Luchene et al. |
| 6,915,271 B1 | 7/2005 | Meyer et al. |

(Continued)

FOREIGN PATENT DOCUMENTS

| | | |
|---|---|---|
| EP | 1866861 A2 | 12/2007 |
| WO | WO9116691 A1 | 10/1991 |

(Continued)

OTHER PUBLICATIONS

Elham Ramezani, Mobile Payment, Jun. 2008, E-Business Technology, web, 1-18 (Year: 2008).*

(Continued)

*Primary Examiner* — I Jung Liu

(57) ABSTRACT

A computer is configured to facilitate prefunding a number of money transfer transaction fees. Each prefunded money transfer transaction fee is usable to pay for a transaction fee associated with a future money transfer send transaction. The computer is further configured to charge an amount for each prefunded money transfer transaction fee based on the number of money transfer transaction fees prefunded. A server connected to the computer is configured to store information related to the prefunded money transfer transaction fees.

6 Claims, 3 Drawing Sheets

(56) References Cited

U.S. PATENT DOCUMENTS

| | | |
|---|---|---|
| 6,938,013 B1 | 8/2005 | Gutierrez Sheris |
| 6,999,943 B1 | 2/2006 | Johnson et al. |
| 7,050,983 B2 | 5/2006 | Kawai |
| 7,083,087 B1 | 8/2006 | Gangi |
| 7,213,744 B2 | 5/2007 | Michelsen et al. |
| 7,258,268 B2 | 8/2007 | Steiger, Jr. |
| 7,356,505 B2 | 4/2008 | March |
| 7,386,518 B2 | 6/2008 | Cordery et al. |
| 7,389,256 B1 | 6/2008 | Adams et al. |
| 7,406,445 B1 | 7/2008 | Silverbrook et al. |
| 7,490,062 B2 | 2/2009 | Hansmann et al. |
| 7,568,615 B2 | 8/2009 | Corona et al. |
| 7,647,244 B2 | 1/2010 | Platner et al. |
| 7,660,734 B1 | 2/2010 | Neal et al. |
| 7,668,612 B1 | 2/2010 | Okkonen |
| 7,693,789 B2 | 4/2010 | Degen et al. |
| 7,742,942 B2 | 6/2010 | Nicholson |
| 7,761,344 B2 | 7/2010 | Smith |
| 7,761,367 B1 | 7/2010 | Scalora et al. |
| 7,797,192 B2 | 9/2010 | Mitchell et al. |
| 7,810,067 B2 | 10/2010 | Kaelicke et al. |
| 7,810,721 B2 | 10/2010 | Powell et al. |
| 7,925,513 B2 | 4/2011 | Chao et al. |
| 8,019,679 B2* | 9/2011 | Bennett .................. G06Q 20/10 705/37 |
| 8,082,210 B2 | 12/2011 | Hansen et al. |
| 8,090,594 B2 | 1/2012 | Grant et al. |
| 8,108,977 B1 | 2/2012 | Miller |
| 8,566,237 B2 | 10/2013 | Forzley |
| 8,571,980 B1 | 10/2013 | Greenwood |
| 8,589,918 B1 | 11/2013 | Csapuntzakis et al. |
| 8,646,685 B2 | 2/2014 | Bishop et al. |
| 8,657,688 B1 | 2/2014 | Zouiten et al. |
| 8,688,570 B2 | 4/2014 | Jones et al. |
| 8,788,278 B2 | 7/2014 | Scribner et al. |
| 8,851,366 B2 | 10/2014 | Modi |
| 9,076,134 B2 | 7/2015 | Grovit et al. |
| 9,092,763 B2* | 7/2015 | Meszaros ............... G06Q 20/02 |
| 2001/0014868 A1 | 8/2001 | Herz et al. |
| 2001/0029467 A1 | 10/2001 | Yagihashi et al. |
| 2001/0039535 A1 | 11/2001 | Tsiounis et al. |
| 2002/0002505 A1 | 1/2002 | Kojima |
| 2002/0052778 A1 | 5/2002 | Murphy et al. |
| 2002/0055907 A1 | 5/2002 | Pater et al. |
| 2002/0062249 A1 | 5/2002 | Iannacci |
| 2002/0091603 A1 | 7/2002 | Steiger et al. |
| 2002/0111908 A1 | 8/2002 | Milberger et al. |
| 2002/0143566 A1 | 10/2002 | Diveley |
| 2002/0152177 A1 | 10/2002 | Wolf |
| 2002/0179401 A1 | 12/2002 | Knox et al. |
| 2003/0080185 A1 | 5/2003 | Werther |
| 2003/0083891 A1 | 5/2003 | Lang et al. |
| 2003/0110072 A1 | 6/2003 | Delurgio et al. |
| 2003/0120590 A1 | 6/2003 | Ieshima et al. |
| 2003/0130883 A1 | 7/2003 | Schroeder et al. |
| 2003/0130948 A1 | 7/2003 | Algiene et al. |
| 2003/0182228 A1 | 9/2003 | Wolf |
| 2003/0208384 A1 | 11/2003 | Nelson et al. |
| 2003/0208440 A1 | 11/2003 | Harada et al. |
| 2003/0220830 A1 | 11/2003 | Myr |
| 2004/0030647 A1 | 2/2004 | Hansen et al. |
| 2004/0107146 A1 | 6/2004 | Alfano |
| 2004/0143496 A1 | 7/2004 | Saenz |
| 2004/0167815 A1 | 8/2004 | DeLaHunt |
| 2004/0172358 A1 | 9/2004 | Lent et al. |
| 2004/0199462 A1 | 10/2004 | Starrs |
| 2004/0205023 A1 | 10/2004 | Hafer et al. |
| 2004/0230527 A1 | 11/2004 | Hansen et al. |
| 2004/0241627 A1 | 12/2004 | Delfing |
| 2005/0131816 A1 | 6/2005 | Britto et al. |
| 2005/0177496 A1 | 8/2005 | Blagg et al. |
| 2005/0209961 A1 | 9/2005 | Michelsen et al. |
| 2005/0246268 A1 | 11/2005 | Foran et al. |
| 2006/0047672 A1 | 3/2006 | Habon et al. |
| 2006/0074627 A1 | 4/2006 | Moore et al. |
| 2006/0136907 A1 | 6/2006 | Bennett et al. |
| 2006/0191994 A1 | 8/2006 | Steiger |
| 2006/0242154 A1 | 10/2006 | Rawat et al. |
| 2006/0253321 A1 | 11/2006 | Heywood |
| 2006/0261150 A1 | 11/2006 | Seifert et al. |
| 2006/0287953 A1 | 12/2006 | Chauhan |
| 2007/0033112 A1 | 2/2007 | Nagle, Jr. |
| 2007/0073617 A1 | 3/2007 | Tolbert et al. |
| 2007/0088010 A1 | 4/2007 | Huebler et al. |
| 2007/0088610 A1 | 4/2007 | Chen |
| 2007/0108271 A1 | 5/2007 | Degen et al. |
| 2007/0121843 A1 | 5/2007 | Atazky et al. |
| 2007/0203821 A1 | 8/2007 | DuFour |
| 2007/0221728 A1 | 9/2007 | Ferro et al. |
| 2007/0233615 A1 | 10/2007 | Tumminaro |
| 2007/0255662 A1 | 11/2007 | Tumminaro |
| 2007/0294116 A1 | 12/2007 | Stephens et al. |
| 2008/0033870 A9 | 2/2008 | Gutierrez-Sheris |
| 2008/0046381 A1 | 2/2008 | Naccache |
| 2008/0109279 A1 | 5/2008 | Csoka |
| 2008/0140568 A1 | 6/2008 | Henry |
| 2008/0147506 A1* | 6/2008 | Ling ..................... G06Q 20/20 705/14.39 |
| 2008/0154719 A1 | 6/2008 | Gounares et al. |
| 2008/0249908 A1 | 10/2008 | Lorberg et al. |
| 2008/0275771 A1 | 11/2008 | Levine |
| 2008/0301040 A1 | 12/2008 | Knudson et al. |
| 2009/0006205 A1 | 1/2009 | Bixler et al. |
| 2009/0006233 A1 | 1/2009 | Chemtob |
| 2009/0006549 A1 | 1/2009 | Singh et al. |
| 2009/0037311 A1 | 2/2009 | Omar |
| 2009/0048980 A1 | 2/2009 | Hubsher |
| 2009/0063261 A1 | 3/2009 | Scribner et al. |
| 2009/0063331 A1* | 3/2009 | Rodin .................... G06Q 40/00 705/39 |
| 2009/0067331 A1 | 3/2009 | Watsen et al. |
| 2009/0089172 A1 | 4/2009 | Quinlan et al. |
| 2009/0089869 A1 | 4/2009 | Varghese |
| 2009/0100168 A1 | 4/2009 | Harris |
| 2009/0106149 A1 | 4/2009 | Bennett et al. |
| 2009/0157520 A1 | 6/2009 | Algiene et al. |
| 2010/0100426 A1 | 4/2010 | Sander et al. |
| 2010/0100477 A1 | 4/2010 | Giammanco |
| 2010/0114774 A1 | 5/2010 | Linaman et al. |
| 2010/0153225 A1 | 6/2010 | Ferro et al. |
| 2010/0161485 A1 | 6/2010 | Bulawa et al. |
| 2010/0235283 A1 | 9/2010 | Gerson |
| 2010/0293113 A1 | 11/2010 | Munzer et al. |
| 2010/0299761 A1 | 11/2010 | Shapiro |
| 2011/0137796 A1 | 6/2011 | Tullis |
| 2011/0213653 A1 | 9/2011 | Mesaros |
| 2011/0246328 A1 | 10/2011 | Dunwoody et al. |
| 2011/0282790 A1 | 11/2011 | Bennett et al. |
| 2011/0313920 A1 | 12/2011 | Trickel |
| 2012/0010993 A1* | 1/2012 | Ferrara et al. ............. 705/14.49 |
| 2012/0016795 A1 | 1/2012 | Hill et al. |
| 2012/0030098 A1 | 2/2012 | Bulawa et al. |
| 2012/0036071 A1 | 2/2012 | Fulton et al. |
| 2012/0209769 A1* | 8/2012 | Rolfs ..................... G06Q 20/10 705/44 |
| 2012/0245987 A1 | 9/2012 | Isaacson et al. |
| 2012/0303524 A1 | 11/2012 | Bertram et al. |
| 2013/0060690 A1 | 3/2013 | Oskolkov et al. |
| 2013/0132067 A1 | 5/2013 | Gelbman |
| 2013/0151418 A1 | 6/2013 | Licciardello et al. |
| 2013/0191194 A1 | 7/2013 | Shreibati et al. |
| 2013/0282561 A1 | 10/2013 | Runkle et al. |
| 2013/0325720 A1 | 12/2013 | Bennett et al. |
| 2014/0095384 A1 | 4/2014 | Basha |
| 2014/0207664 A1 | 7/2014 | Sander et al. |
| 2014/0213345 A1 | 7/2014 | Zouiten et al. |
| 2014/0244414 A1 | 8/2014 | Runkle et al. |
| 2014/0250014 A1 | 9/2014 | Runkle et al. |
| 2014/0278900 A1 | 9/2014 | Scribner et al. |
| 2014/0279228 A1 | 9/2014 | Fry et al. |

(56) References Cited

U.S. PATENT DOCUMENTS

2015/0039499 A1 2/2015 Christopherson et al.
2015/0149355 A1 5/2015 Arnthong et al.

FOREIGN PATENT DOCUMENTS

WO WO0146778 A2 6/2001
WO WO2009052365 A1 4/2009

OTHER PUBLICATIONS

Banorte Selects Moneygram for US Transfers—Mexico, Apr. 17, 2002, Business News Americas—Latin America's Business Information Leader, 1 page.
Information on MoneyGram.com 2003-2006, archived web pages printed from www.archive.org, date is in the URL in YYYYMMDD format.
International Search Report and Written Opinion issued in PCT/US2008/080292, dated Jan. 20, 2009, 14 pages.
International Search Report and Written Opinion issued in PCT/US2012/022491, dated Jul. 5, 2012, 10 pages.
International Search Report and Written Opinion issued in PCT/US2012/038607, dated Nov. 13, 2012, 20 pages.
MoneyGram Adds 1,500 Bancomer Locations in Mexico, Apr. 17, 2001, 2 pages.
MoneyGram Corporate—How to transfer money, MoneyGram. International, webpages from http://www.moneygram.com/MGICorp/ConsumerProducts . . . , 5 Pages; May 30, 2007.
Press release from Norkom Technologies, "Wall Street's Back Office Launches Market-Leading AML software from Norkom," Feb. 15, 2007, 2 pp., http://www.norkom.com.
International Search Report and Written Opinion issued in PCT/US2013/037595, dated Jul. 30, 2013, 11 pages.
*Listingbook, LLC* v. *Market Leader, Inc.*, F.Supp.3d (2015), Westlaw 2015 WL 7176455, 12 pages.
"Money Transmitter Services", snapshot taken Oct. 2011, http://web.archive.org/web/20111 0121 00544/http://www.dfs.ny.gov/consumer/usingamoneytrans.htm, 2 pages.
Dr. Manuel Orozco. "The Remittance Marketplace: Prices, Policy and Financial Institutions." Pew Hispanic Center, Jun. 2004, 45 pages.
"Authoring Techniques for Device Independence W3C Woking Group Note", Feb. 18, 2004, 57 pages.
Lorna Priest, "Keyboard Installation and Use", Feb. 2009, available at https://scripts.sil.org/cms/scripts/page.php?site_id=nrsi&id=keyboardinstallationanduse (Year: 2009), 12 pages.

\* cited by examiner

PREFUNDING FOR MONEY TRANSFER SEND TRANSACTIONS

TECHNICAL FIELD

The present invention relates to computer systems for money transfers. More particularly, the present invention relates to systems and methods for prefunding money transfer send transactions and transaction fees.

BACKGROUND

A number of businesses offer money transfer and other services through a network of agents. A customer that desires to use these services to transfer money to a third party can take the money to an agent of the money transfer service. The agent accepts the money, obtains necessary information such as the customer's identity and the identity of the receiver, and initiates a transaction. The money is then made available to the receiver by another agent.

When a customer is ready to send the transaction, the agent collects fees to cover processing costs for the money transfer service, and provides a source of revenue for the money transfer service. A customer who makes frequent money transfers may be subjected to a transaction fee each time a money transfer transaction is generated and sent. In addition, the customer may provide cash, money order, or other immediate or near-immediate form of payment to the agent, and agent is responsible for the receipt and processing of the payment. This carrying and exchange of immediate or near-immediate forms of currency for each transaction can be inconvenient.

An approach to processing money transfers that both reduces the instances that currency is carried and exchanged and reduces fees for repeat customers would also be useful.

SUMMARY

In one aspect, the present disclosure relates to a system for sending money transfer transactions. The system includes a computer configured to facilitate prefunding a number of money transfer transaction fees. Each prefunded money transfer transaction fee is usable to pay for a transaction fee associated with a future money transfer send transaction. The computer is further configured to charge an amount for each prefunded money transfer transaction fee based on the number of money transfer transaction fees prefunded. A server connected to the computer is configured to store information related to the prefunded money transfer transaction fees.

In another aspect, the present disclosure relates to a method for operating a computer system for sending money transfers. The method includes receiving a request on a computer to prefund a number of money transfer transaction fees that are each usable to pay for a transaction fee associated with a future money transfer send transaction. An amount is charged for each prefunded money transfer transaction fee based on the number of money transfer transaction fees prefunded The method further includes receiving funds to pay for the prefunded money transfer transaction fees, and storing information related to the prefunded money transfer transaction fees on a server.

In a further aspect, the present disclosure relates to a method for operating a computer system for sending money transfers. The method includes receiving a request on a computer to prefund either (a) a number of money transfer transaction fees each usable to pay for a transaction fee associated with a future money transfer send transaction or (b) a number of future money transfer send transactions and associated money transfer transaction fees. Additionally, the method includes charging an amount for each prefunded money transfer transaction fee that is based on (a) the number of money transfer transaction fees prefunded and (b) whether future money transfer send transactions are being prefunded. The method further includes receiving funds to pay for the prefunded money transfer transaction fees and any prefunded future money transfer send transactions, and storing information related to the prefunded money transfer transaction fees and any prefunded future money transfer send transactions on a server.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
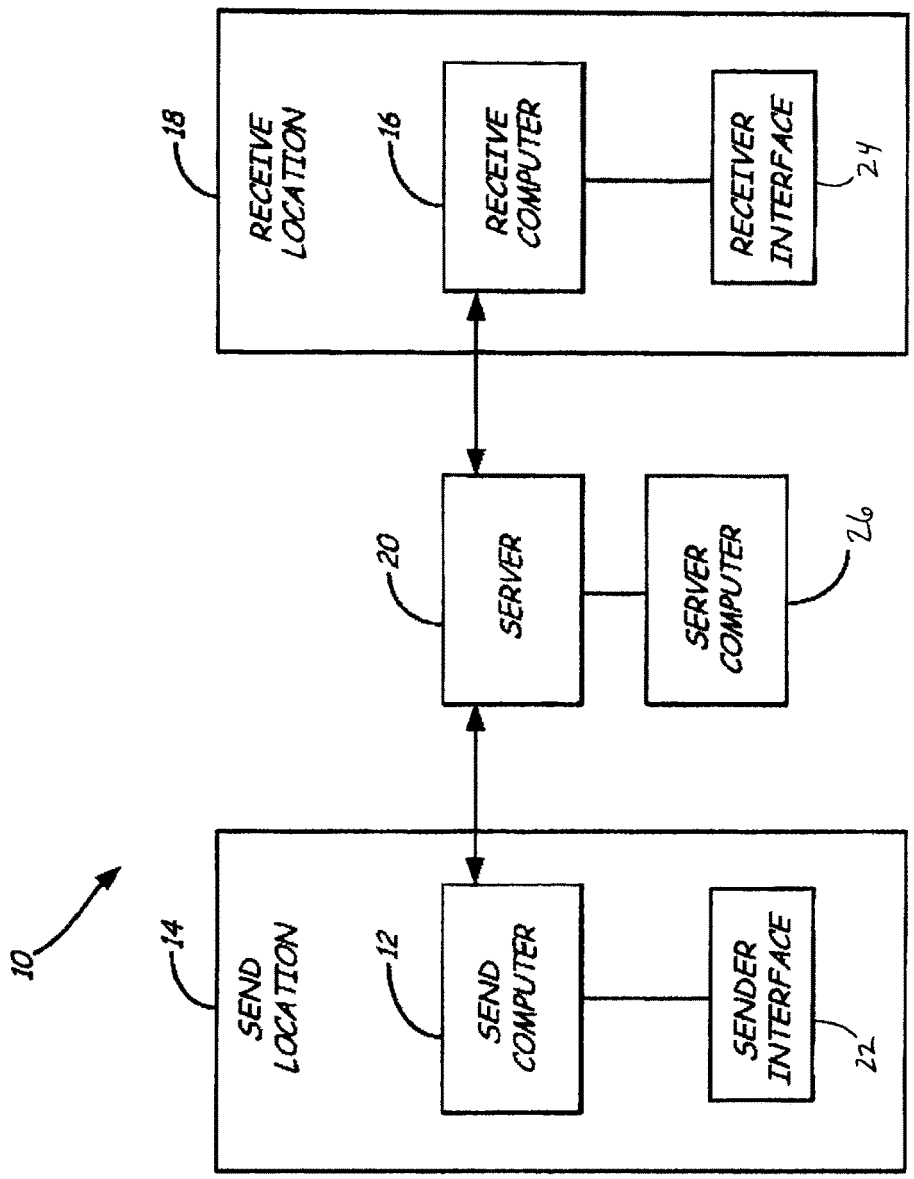
FIG. 1 is a block diagram of an embodiment of a system for prefunding money transfer send transactions and fees.

FIG. 1 is a block diagram of an embodiment of a system 10 for sending and receiving money transfers. System 10 includes a send computer 12 at a send location 14 and a receive computer 16 at a receive location 18. The send computer 12 and the receive computer 16 communicate with a central server 20, for example via a communication network such as the internet. In some embodiments, a sender interface 22 is connected to the send computer 12, and a receiver interface 24 is connected to the receive computer 16. The system 10 facilitates the sending of money transfers through the send computer 12, and the receipt of the money transfer through the receive computer 16.

The send location 14 may be a facility that is approved by a financial services organization to send purchase requests for money transfers to the server 20. The send location 14 may be a store or dedicated location that provides redemption services for money transfers. Alternatively, the send location 14 may access a computer remotely, such as via a telephone call or the internet. The send computer 12 is operated by an agent at the approved send location 14. The send computer 12 may include software that facilitates entry of information to request sending the money transfer for subsequent transmission to the server 20 for approval. The agent at the send location 14 may also review purchaser identification and accept funds from the sender of the money transfer. In some embodiments, the agent accepts funds on behalf of the financial services organization. The send location 14 may also include a telephone (not shown) or other voice communications device to contact the financial services organization if questions arise during the money transfer request process. While a single send location 14 is shown in FIG. 1, in actual implementation, the system 10 includes a plurality of send locations 14 that each includes a send computer 12 that communicates with the server 20.

In alternative embodiments, the send computer 12 may be any computer configured to provide information to the server 20 via a secure internet or server connection. For example, the send computer 12 may be a home computer, kiosk, or other interactive device. The send computer 12 may include a web browser or other application that provides a user interface to enter information to send a money transfer. The web browser may allow for entry of sender identification information and sender account information, the latter of which authorizes withdrawal of funds from an account with a financial institution to fund the money transfer. As another example, the send computer 12 may be configured to receive money transfer send information from the sender via telephone or interactive voice recognition systems. As a further example, a telephone at the send location 14 may be used to contact a call center (not shown) to initiate a send request to the server 20.

The receive location 18 may be an institution that is approved by the financial services organization to receive money transfers for the benefit of a receiver associated with the institution and issue funds to the money transfer receivers. As discussed above, the receive location 18 may be institutions such as a correctional facility, custodial care facility, a court, or a school. The receive computer 16 at the receive location 18 may be operated by an approved employee of the institution using the receiver interface 24. The receive computer 18 may include software that facilitates retrieval of information about money transfers sent to the institution for the benefit of receivers associated with the institution. The employee operating the receive computer 16 at the receive location 18 may also, in some cases, review the information associated with the money transfer, such as the amount and purpose of the money transfer funds. If approved, the employee issues funds to the money transfer receiver's account at the institution. The receive location 18 may also include a telephone or other voice communications device to contact the financial services organization if questions arise during the money transfer receipt process. While a single receive location 18 is shown in FIG. 1, in actual implementation, the system 10 includes a plurality of receive locations 18 that each includes a receive computer 16 that communicates with the server 20.

The server 20 may be housed and/or operated by or on behalf of the financial services organization that, among other functions, approves and coordinates send transactions of money transfers at the send location 14 and receive transactions of money transfers at the receive location 18. The server 20 facilitates approval of send requests from the send location 14 and receive requests from the receive location 18. In some embodiments, the server 20 is configured to process send and receive requests automatically. In other embodiments, the server 20 provides information to a user at the financial services organization for review and approval. For example, the server 20 may be connected to a computer 26 that provides an interface to a user at the financial services organization to review and approve or deny money transfer send or receive transactions. In some embodiments, the server 20 provides compliance functions for money transfer transaction. The server 20 includes storage capabilities to store information from money transfer send transactions for later retrieval during the money transfer receive approval process. In addition, the server 20 may store other information such as, for example, past customer money transfer send/receive activity, customer account information, and computer identification and log-in information for the send computer 12 and receive computer 16.

As will be described in more detail herein, the system 10 facilitates allowing a customer to prefund money transfer transaction fees to be applied to money transfers purchased at a later time. The system 10 may also be configured to allow the customer to prefund future money transfers as well as the transaction fees, to be sent at a future date. In some embodiments, the number of transaction fees prefunded and/or whether future money transfers are funded establishes the amount charged for each prefunded transaction fee. For example, the per transaction fee amount may be reduced for each transaction fee or each group of transaction fees prefunded.

By allowing the customer to prefund a number of transaction fees and/or money transfers, the financial services organization is able to establish a recurring relationship with the customer in one visit to the send location. In addition, the customer is able to set up multiple transactions without having to carry cash, money orders, or other forms of immediate or near-immediate currency to the send location each time a money transfer is sent. This provides convenience for both the customer and agent when the prefunded future money transfer and transaction fees are redeemed. In addition, prefunded transactions and fees increase safety for the customer and agent, since it reduces the number of instances that the customer brings funds to the send location.

Figure 2:
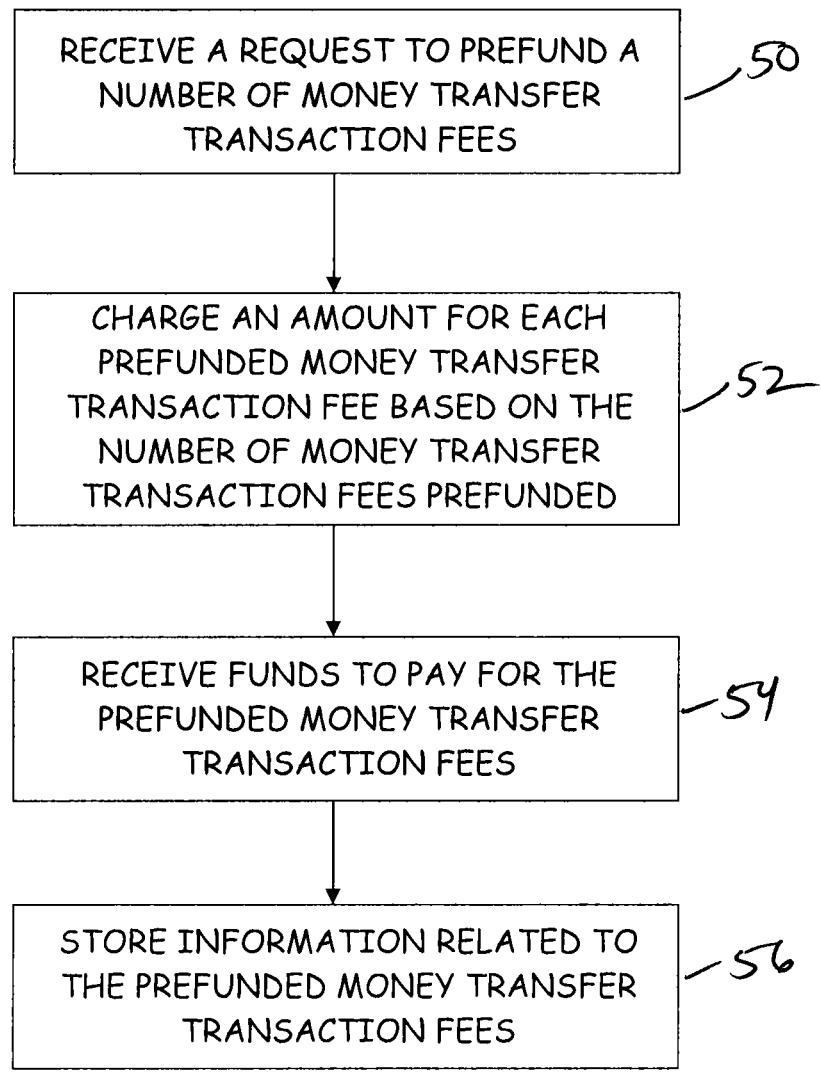
FIG. 2 is a flow diagram of an embodiment of a process for controlling the system of FIG. 1 to prefund money transfer transaction fees.

FIG. 2 is a flow diagram of an embodiment of a process for prefunding money transfer transaction fees. In step 50, a request to prefund a number of money transfer transaction fees is received from a customer at the send computer 12. The customer may provide the requested number of transaction fees to be prefunded to an agent for the financial services organization at the send location 14. Alternatively, the customer may enter information about the number of money transfer transaction fees on the send computer 12 via the send interface 22 (e.g., via a self-service kiosk or a computer connected to the server 20 via the internet). In some embodiments, transaction fees are calculated as a percentage of the amount of the money transfer. In these embodiments, the customer may be asked to provide the expected amount of the future money transfers. The send computer 12 may then calculate the transaction fee associated with the expected amount of the future money transfers.

In step 52, the send computer 12 charges an amount for each prefunded money transfer transaction fee based on the number of money transfer transaction fees prefunded. For example, in some embodiments, the amount charged for the each prefunded transaction fee may be reduced by a percentage of the full price transaction fee. The percentage reduction in the amount charged for each prefunded transaction fee may increase with increasing number of transaction fees prefunded. For example, the percentage reduction in the amount charged for each prefunded transaction fee may be linearly related to the number of transaction fees prefunded. As another example, the percentage reduction may be calculated based on an incremental number of transaction fees prefunded (i.e., larger discount for each group of transaction fees prefunded). In some embodiments, the send computer 12 may be programmed with a maximum or cap percentage reduction such that, when the cap percentage reduction is reached, prefunding of additional transaction fees does not result in an increased percentage reduction in the amount charged for each prefunded transaction fee.

In one exemplary implementation, the send computer 12 is configured to reduce the charge for each prefunded money transfer transaction fee by 1% for each transaction fee prefunded. As another example, the send computer 12 may be configured to increase the per prefunded transaction fee discount with each group of transaction fees prefunded (e.g., for each group of six). The percentage may be capped at a discount maximum, as discussed above. The discount percentage increase may be linear (i.e., same percentage increase with each group of transaction fees prefunded) or may escalate with increasing numbers of groups of transaction fees funded. In the latter case, one exemplary implementation may provide a 2% discount for six prefunded transaction fees, a 5% discount for twelve prefunded transaction fees, and a 15% discount for twenty-four prefunded transaction fees. These discounts and prefunded transaction fee group numbers are merely exemplary, and any combination of prefunded transaction fee group numbers and associated discounts are possible.

When the percentage reduction for each prefunded transaction fee has been calculated based on the number of transaction fees prefunded, then, in step 54, funds to pay for the prefunded money transfer transaction fees are received by the financial services organization. For example, if the customer is working with an agent at a send location 14, the customer provides funds (e.g., cash, money order, etc.) in the calculated amount to the agent. As another example, if the customer is using a self-service send computer 12 (e.g., kiosk, personal computer, etc.), the customer may pay for the prefunded transaction fees via electronic means, such as with a credit card or via direct withdrawal from a bank account.

In some embodiments, prefunding money transfer transaction fees may lock in or secure a foreign exchange rate for future money transfers. When the customer requests to prefund transaction fees, the customer may also be prompted to provide the destination country of the future money transfer associated with the prefunded transaction fees. The send computer 12 may be configured to determine the exchange rate between the country from which the customer is sending, and the country of the recipient of the future money transfer. Then, the send computer 12 locks in the exchange rate when the prefunding of the transaction fees has been completed. In some embodiments, the exchange rate is locked in when the funds to cover the prefunded money transfer fees are received.

The send computer 12 may also be configured to assign an expiration date to the prefunded transaction fees. In some embodiments, the locked in exchange rate associated with each prefunded transaction fee lapses after the expiration date. In some embodiments, for a prefunded transaction fee that has passed the expiration date, the exchange rate applied is the exchange rate on the day that the money transfer associated with the prefunded transaction fee is sent. The expiration date may also affect other aspects of the prefunded transaction fees, such as the amount of the discount applied to each prefunded transaction fee.

In step 56, information related to the prefunded money transfer transaction fees is stored, for example in server 20. The information related to the prefunded transaction fees may include, for example, the amount prefunded for each transaction fee and a confirmation number for each prefunded transaction fee or each group of transaction fees. The information may also include locked exchange rate and expiration date information for each prefunded transaction fee. In various embodiments, during the process of funding the transaction fees, the send computer 12 may be configured to prompt the customer for information associated with the prefunded transaction fees. For example, the send computer 12 may prompt the customer to provide identification information about the customer (e.g., name, photograph, government issued identification information, etc.) to allow the system 10 to associate the prefunded transaction fees with the customer for ease of retrieval upon use with a future money transfer transaction. The information about the customer may be stored with the transaction confirmation number in the server 20. The information associated with the prefunded transaction fees stored in the server 20 may also include information about the future money transfers associated with the prefunded transaction fees, such as the send amount, send date, and recipient identification information.

When the customer wishes to send a money transfer, the customer may go to a send location 14. The send location 14 may be the same or a different send location 14 as the send location 14 at which the transaction fees were prefunded. The customer provides information related to the money transfer (e.g., money transfer recipient, money transfer amount, etc.), and the transaction fees for the money transfer are calculated. The customer may then provide a confirmation number or other identifying information associated with the prefunded transaction fees stored in the server 20. The send computer 12 then retrieves information about the transaction fees prefunded by the customer, and applies the prefunded transaction fees to the money transfer transaction. The prefunded transaction fee used on the money transfer transaction is then marked as being used on the server 20.

Figure 3:
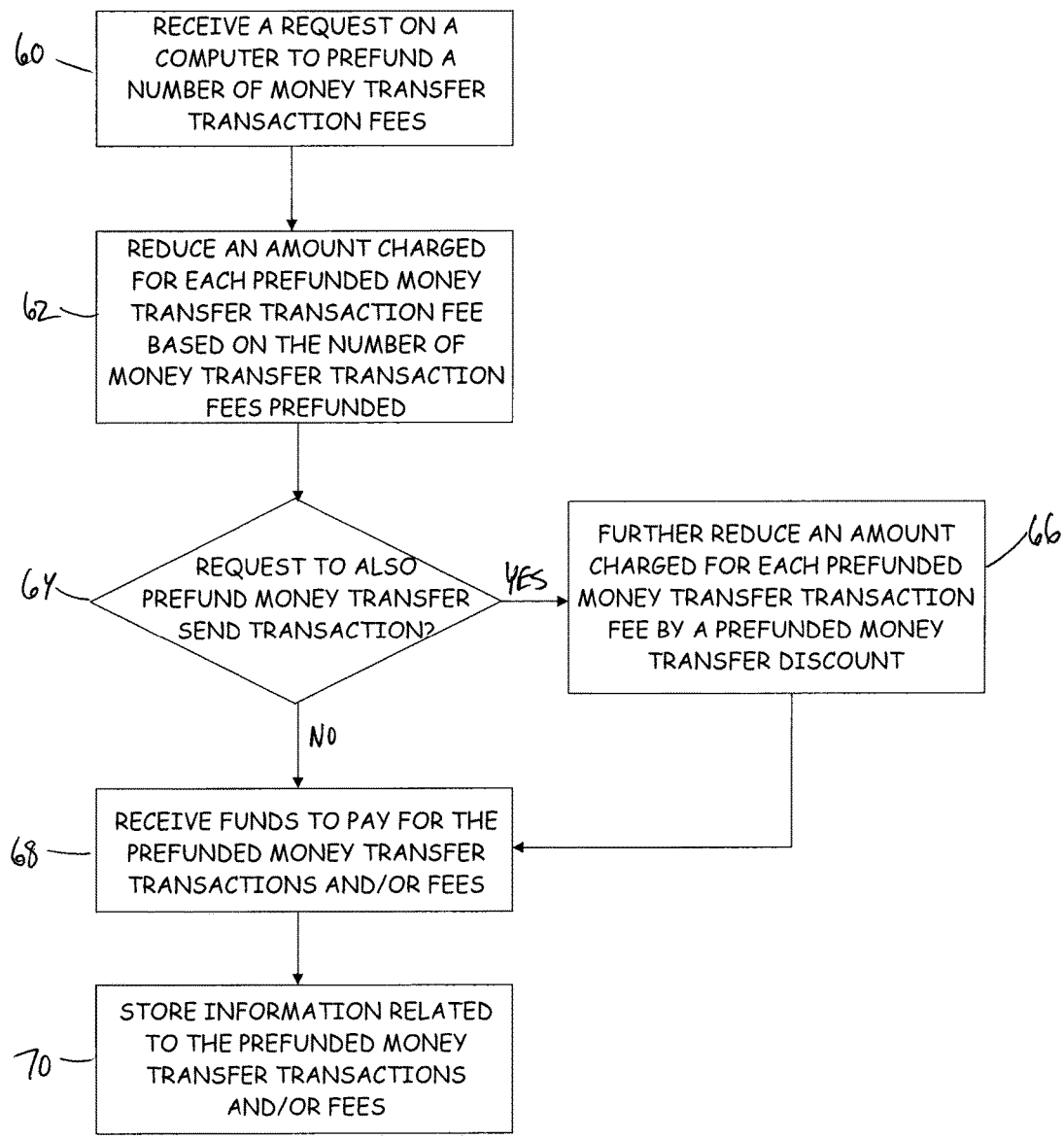
FIG. 3 is a flow diagram of another embodiment of a process for controlling the system of FIG. 1 to prefund money transfer send transactions and transaction fees.

In some cases, it may be useful or convenient to also fund money transfers in advance of the actual send date. FIG. 3 is a flow diagram of an embodiment of another embodiment of a process for controlling the system 10 shown in FIG. 1. In step 60, a request to prefund a number of money transfer transaction fees is received on the send computer 14. Step 60 is substantially similar to step 50 discussed above in FIG. 2. The customer may provide the requested number of transaction fees to be prefunded to an agent for the financial services organization at the send location 14. Alternatively, the customer may enter information about the number of money transfer transaction fees on the send computer 12 via the send interface 22 (e.g., via a self-service kiosk or a computer connected to the server 20 via the internet).

In step 62, the amount for each prefunded money transfer transaction fee is reduced by an amount that is based on the number of transaction fees prefunded. Step 62 is substantially similar to step 52 discussed above. For example, in some embodiments, the amount charged for the each prefunded transaction fee may be reduced by a percentage of the full price transaction fee. The percentage reduction in the amount charged for each prefunded transaction fee may increase with increasing number of transaction fees prefunded. For example, the percentage reduction in the amount charged for each prefunded transaction fee may be linearly related to the number of transaction fees prefunded. As another example, the percentage reduction may be calculated based on an incremental number of transaction fees prefunded.

In decision step 64, the send computer 12 prompts the customer to decide whether to prefund one or more money transfer send transactions. If the customer does not request to fund any money transfer send transactions, then, in step 68, the customer provides funds to pay for the prefunded money transfer transaction fees, similar to step 54 in FIG. 2. Information about the prefunded money transfer transaction fees is then stored in the server 20, similar to step 56 in FIG. 2.

On the other hand, if in decision step 64 the customer decides to fund one or more money transfer transactions, then, in step 66, the amount charged for each prefunded transaction fee is further discounted by a prefunded money transfer discount. The prefunded money transfer discount may be a flat percentage that is added on to the discount applied above in step 62. For example, in one implementation, the prefunded money transfer discount is 5%. In other embodiments, the prefunded money transfer discount may be a function of the number of money transfers prefunded. The combined discounts applied for the prefunding of money transfers and transaction fees may be capped at a maximum discount, as discussed above.

After the discounts for prefunding money transfers and transaction fees is calculated, then, in step 68, funds to pay for the prefunded money transfer transaction fees are received by the financial services organization. For example, if the customer is working with an agent at a send location 14, the customer provides funds (e.g., cash, money order, etc.) in the calculated amount to the agent. As another example, if the customer is using a self-service send computer 12 (e.g., kiosk, personal computer, etc.), the customer may pay for the prefunded transaction fees via electronic means, such as with a credit card or via direct withdrawal from a bank account.

In step 70, information related to the prefunded money transfers and transaction fees is stored, for example in server 20. The information related to the prefunded money transfers may include, for example, the amount prefunded for each money transfer and a confirmation number for each money transfer or each group of money transfers. The information may also include locked exchange rate and expiration date information for each prefunded transaction fee. The information may further include customer identification information, the send dates of the prefunded money transfers, and recipient identification information.

When the customer wishes to send a prefunded money transfer, the customer may go to a send location 14. The send location 14 may be the same or a different send location 14 as the send location 14 at which the transaction fees were prefunded. The customer provides information to retrieve the prefunded money transfer (e.g., confirmation number, customer identification, send amount, recipient information, etc.) The send computer 12 then retrieves information about the money transfers prefunded by the customer, applies the prefunded transaction fees associated with the money transfer transaction, and sends the money transfer.

The prefunding of money transfers may be useful and convenient to a customer who frequently sends money transfers, particularly to the same recipient. For example, if a customer uses money transfer services to pay a recurring bill, the customer can prefund money transfers to cover multiple future bills in a single visit to a send location 14. In some embodiments, an account number the customer uses in association with the payee of the bill may be attached to the prefunded money transfer. Thus, when the bill comes due, the customer may go to the send location and approve sending of the prefunded money transfer to the payee. Alternatively, the send computer 12 may be configured to send a prefunded money transfer automatically on or before the due date of the bill.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method for operating a computer system for sending money transfers, the method comprising:
   providing, an interface of the computer system, the interface being configured to receive requests to prefund future money transfers and prefund a plurality of money transfer transaction fees;
   receiving, via the interface of the computer system, information about the future money transfers including an amount of each of the future money transfers;
   receiving a request, via the interface of the computer system, to prefund the future money transfers, wherein the request is received during a transaction separate from each of the future money transfers;
   receiving a request, via the interface of the computer system, to prefund the plurality of money transfer transaction fees associated with one or more of the future money transfers, wherein the request is received during a transaction separate from the future money transfers to which the plurality of money transfer transaction fees are to be applied;
   receiving, via the interface of the computer system, information representative of send locations and destination locations for each of the future money transfers, and determining an exchange rate for each of the future money transfers based on the received send locations and the received destination locations when a received send location for a future money transfer has a different currency than a received destination location for the future money transfer;
   receiving, from the computer system, rules to determine a total discount for the plurality of money transfer transaction fees based on how many of the plurality of money transfer transaction fees are to be prefunded, wherein the total discount comprises (a) a transaction fee discount for prefunding the money transaction fees, wherein the transaction fee discount increases as the plurality of money transfer transaction fees to be prefunded increases by an incremental number up to a maximum discount and (b) a money transfer discount for prefunding the future money transfers, wherein the money transfer discount is added to the transaction fee discount;
   calculating, on the computer system, an amount of funds to be charged for the future money transfers and the plurality of money transfer transaction fees based on the amount of each of the future money transfer, how many of the plurality of money transfer transaction fees are to be prefunded, and the total discount;
   presenting, on the interface of the computer system, the calculated amount of funds to be charged for the future money transfers and the plurality of money transfer transaction fees, wherein the calculated amount is presented on the interface during a transaction separate from the future money transfers to which the calculated amount of funds are to be applied;
   receiving, via the interface of the computer system, information representative of receipt of funds for the future money transfers, wherein the information representative of the receipt of funds is received during a transaction separate from the future money transfers to which the receipt of funds are to be applied;
   receiving, via the interface of the computer system, information representative of receipt of funds for the plurality of money transfer transaction fees;
   locking, by the computer system, the exchange rates for the future money transfers in response to receiving the funds for the plurality of money transfer transaction fees, wherein the locked exchange rates apply to the prefunded future money transfers to which the plurality of money transfer transaction fees apply;

associating, by the computer system, an expiration date with the locked exchange rate for each of the prefunded future money transfers, wherein an exchange rate associated with a prefunded future money transfer reverts from the locked exchange rate to a current exchange rate after the expiration date;

storing, on the computer system, confirmation information of the prefunded future money transfers and the prefunded money transfer transaction fees;

providing, on the interface of the computer system, the confirmation information of the prefunded future money transfers and the prefunded money transfer transaction fees;

receiving a request, via the interface of the computer system, for a money transfer transaction, wherein the request is received after the transaction that includes storing confirmation information of the prefunded future money transfers and the prefunded money transfer transaction fees;

confirming, by the computer system, the amount of the prefunded money transfer transaction fee is sufficient for the money transfer transaction;

applying, by the computer system, prefunded money transfer funds to (a) the money transfer transaction and (b) a money transfer transaction fee associated with the money transfer transaction;

applying, by the computer system, a locked exchange rate to the money transfer transaction when a date of the received request for the money transfer transaction is on or before the expiration date; and applying, by the computer system, a current exchange rate to the money transfer transaction when a date of the received request for the money transfer transaction is after the expiration date.

2. The method of claim 1, wherein storing confirmation information of the prefunded money transfers includes storing a send date, a prefunded amount, and recipient information for said each money transfer.

3. A computer system for sending money transfers, the computer system comprising:
an interface configured to:
receive information about future money transfers including an amount of each of the future money transfers;
receive a request to prefund the future money transfers, wherein the request is received during a transaction separate from each of the future money transfers;
receive a request to prefund a plurality of money transfer transaction fees associated with one or more of the future money transfers, wherein the request is received during a transaction separate from the future money transfers to which the plurality of money transfer transaction fees are to be applied;
receive information representative of send locations and destination locations for each of the future money transfers, and determining an exchange rate for each of the future money transfers based on the received send locations and the received destination locations when a received send location for a future money transfer has a different currency than a received destination location for the future money transfer;

a processor configured to:
determine a total discount for the plurality of money transfer transaction fees based on how many of the plurality of money transfer transaction fees are to be prefunded, wherein the total discount comprises (a) a transaction fee discount for prefunding the money transaction fees, wherein the transaction fee discount increases as the plurality of money transfer transaction fees to be prefunded increases by an incremental number up to a maximum discount and (b) a money transfer discount for prefunding the future money transfers, wherein the money transfer discount is added to the transaction fee discount;
calculate on the computer system an amount of funds to be charged for the future money transfers and the plurality of money transfer transaction fees based on the amount of each of the future money transfers, how many of the plurality of money transfer transaction fees are to be prefunded, and the total discount;
send to the interface the calculated amount of funds to be charged for the future money transfers and the plurality of money transfer transaction fees, wherein the calculated amount is presented on the interface during a transaction separate from the future money transfers to which the calculated amount of funds are to be applied;
receive from the interface information representative of receipt of funds for the future money transfers, wherein the information representative of the receipt of funds is received during a transaction separate from the future money transfers to which the receipt of funds are to be applied;
receive from the interface information representative of receipt of funds for the plurality of money transfer transaction fees;
lock the exchange rates for the future money transfers in response to receiving the funds for the plurality of money transfer transaction fees, wherein the locked exchange rates apply to the prefunded future money transfers to which the plurality of money transfer transaction fees apply;
associate an expiration date with the locked exchange rate for each of the prefunded future money transfers, wherein an exchange rate associated with a prefunded future money transfer reverts from the locked exchange rate to a current exchange rate after the expiration date;
store confirmation information of the prefunded future money transfers and the prefunded money transfer transaction fees;
provide to the interface the confirmation information of the prefunded future money transfers and the prefunded money transfer transaction fees;
receive from the interface a request for a money transfer transaction, wherein the request is received after the transaction that includes storing the confirmation information of the prefunded future money transfers and the prefunded money transfer transaction fees;
confirm the amount of the prefunded money transfer transaction fee is sufficient for the money transfer transaction;
apply prefunded money transfer funds to (a) the money transfer transaction and (b) a money transfer transaction fee associated with the money transfer transaction;

apply a locked exchange rate to the money transfer transaction when a date of the received request for the money transfer transaction is on or before the expiration date; and apply a current exchange rate to the money transfer transaction when a date of the received request for the money transfer transaction is after the expiration date.

4. The method of claim 1 and further comprising:

presenting prompts on the interface of the computer system, the prompts including a request for customer identification and recipient identification information; and storing, at the computer system, information received in response to the prompts.

5. The computer system of claim 3, wherein the processor is further configured to:

send prompts to the interface, the prompts including a request for customer identification and recipient identification information; and store at the information received in response to the prompts.

6. The computer system of claim 3, wherein to store the confirmation information, the processor is configured to store a send date, a prefunded amount, and recipient information for each prefunded money transfer.

* * * * *